Jan. 12, 1971     G. C. WISWELL, JR     3,553,970
INFLATABLE CLAMPING DEVICE
Filed Nov. 26, 1968     2 Sheets-Sheet 1
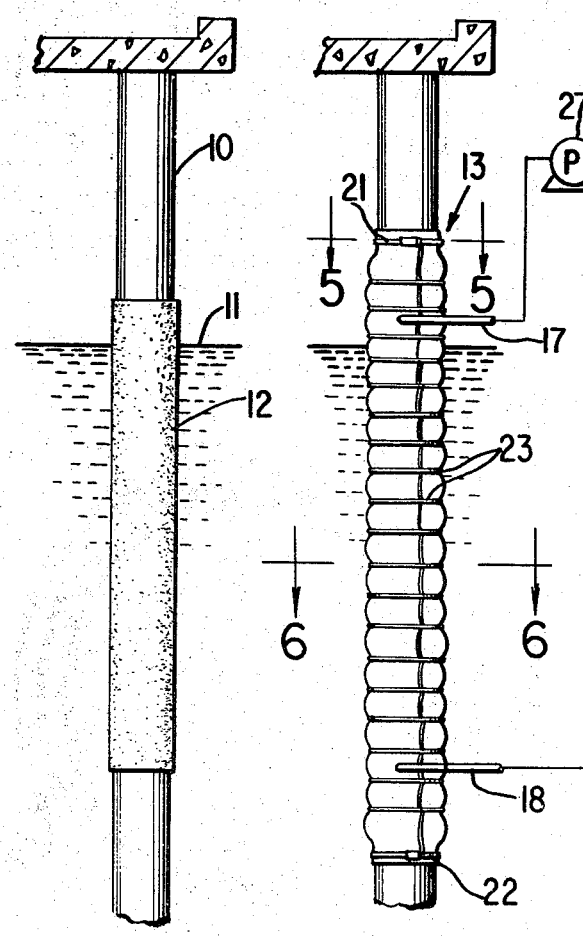
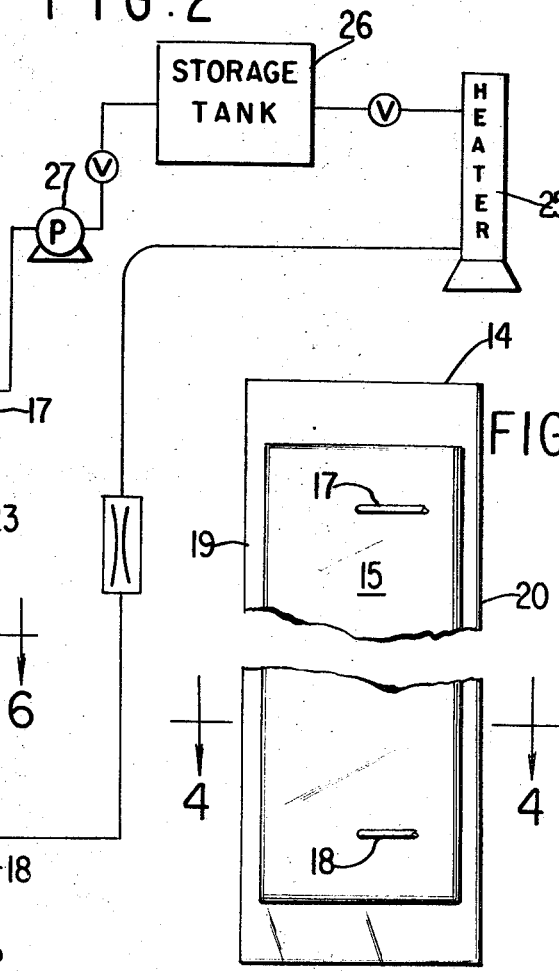
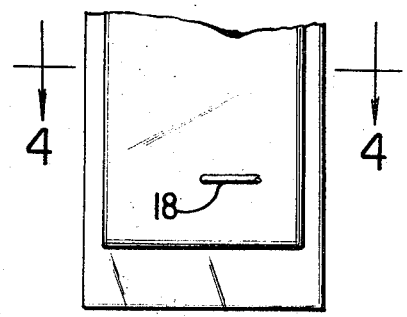
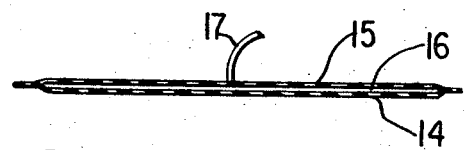
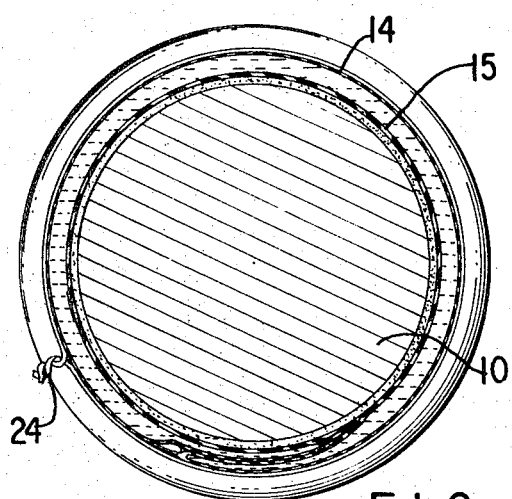
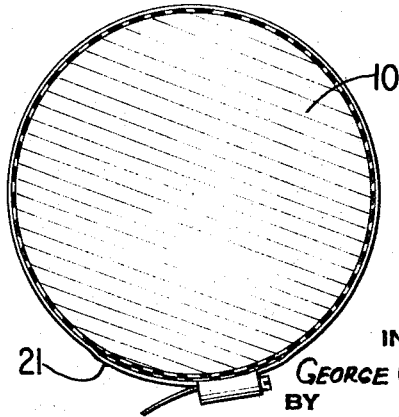
INVENTOR
GEORGE C. WISWELL, JR.
BY
Snythe & Moore
ATTORNEYS Jan. 12, 1971     G. C. WISWELL, JR     3,553,970
INFLATABLE CLAMPING DEVICE
Filed Nov. 26, 1968     2 Sheets-Sheet 2
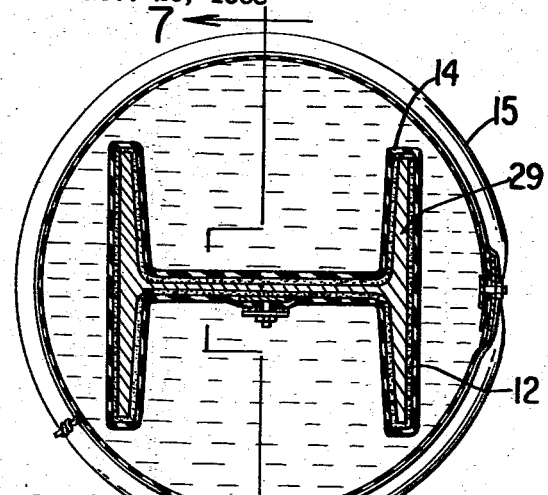
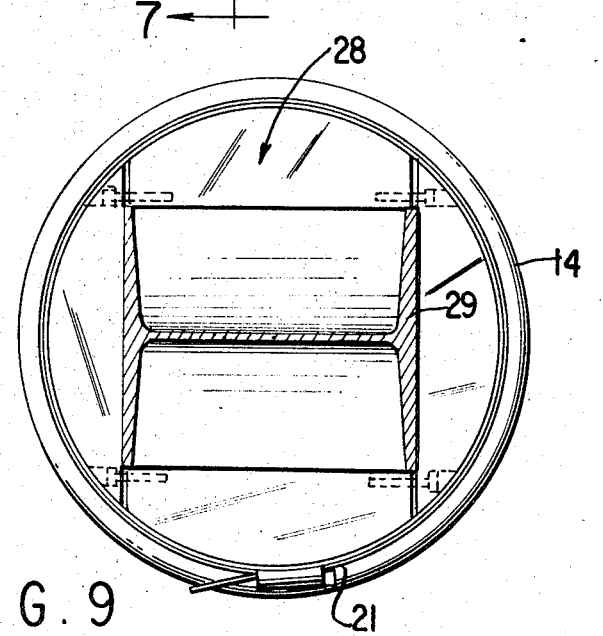
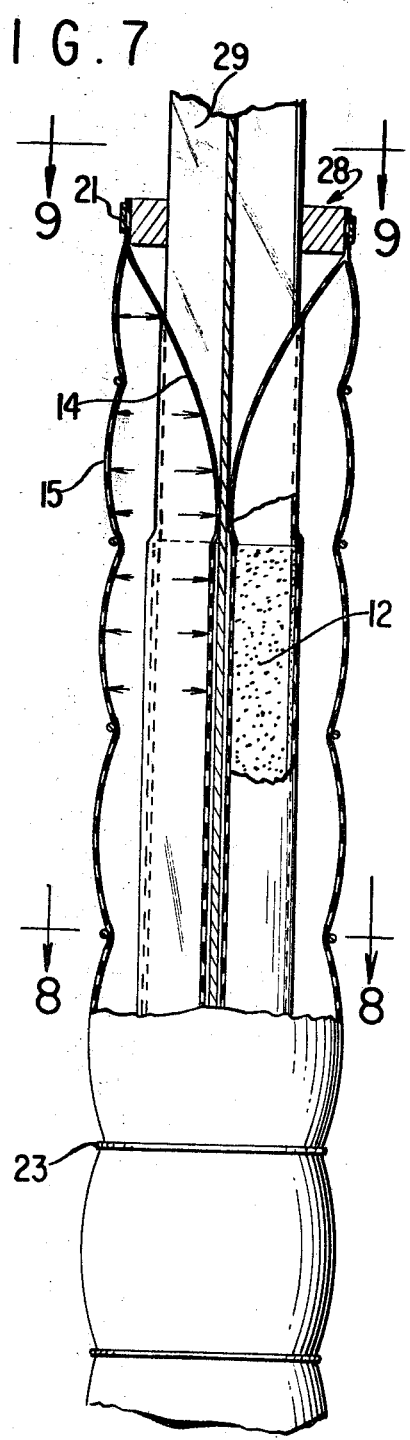
INVENTOR
GEORGE C. WISWELL, JR.
BY
Smythe & Moore
ATTORNEYS

United States Patent Office 3,553,970
Patented Jan. 12, 1971

3,553,970
INFLATABLE CLAMPING DEVICE
George C. Wiswell, Jr., 1014 Pequot Road,
Southport, Conn. 06490
Filed Nov. 26, 1968, Ser. No. 779,184
Int. Cl. E02d 5/60
U.S. Cl. 61—54    8 Claims

ABSTRACT OF THE DISCLOSURE

An inflatable clamping device is provided for applying pressure to a coating on a submerged pile structure as the coating is being cured. The device is formed by attaching two sheets of flexible material together to form a fluid-tight chamber therebetween with the two sheets being wrapped around the coated material and a fluid under pressure introduced to the chamber between the sheets to apply a pressure against the coating. The inner sheet is formed of sufficient material so as to conform to the configuration of the pile, such as when the pile has an H-section.

---

Submerged piles or other portions of structures which are under water a part of the time have been coated with various materials to prevent deterioration. One such material is an epoxy resin which may be applied to the area of the pile being treated in any suitable manner. In one such way, the epoxy resin can be pre-spread at the factory onto a thin, flexible, plastic sheet which, on the side bearing the epoxy, has small protuberances to act as a gauge of the film thickness and to maintain a uniformity of the thickness of the coating when placed about the pile. A protective film may be then applied to the coating. In the field, the protective film is removed and the epoxy carrying sheet is wrapped around the pile. In order that the epoxy forms a durable coating, it is necessary that the coating be cured as a step in the application process. The curing of the resin should be conducted under certain suitable conditions of pressure and temperature.

A problem immediately arises in maintaining this plastic coating at a suitable temperature when the coating has been applied under water. At the same time that a desired temperature must be maintained, the coating must be subjected to a uniform pressure in order that the final coating, when curing is completed, is uniform in thickness and will last for a long period of time.

One of the objects of the present invention is to provide an improved device for applying pressure to a coating on a submerged pile or the like when the coating is being cured.

Another of the objects of the present invention is to provide an inflatable device for clamping around the coated portion of a pile or the like.

Another object of the invention is to provide a simplified device for maintaining a coating under a predetermined pressure and temperature while the coating is being cured.

According to one aspect of the present invention, a device for applying pressure to a coating material on a submerged pile structure during the curing of the material may comprise a pair of sheets of fluid impervious flexible material which are attached together to define a relatively flat fluid-tight chamber therebetween. One sheet may be greater in area than the second sheet with the smaller sheet being attached along its edges onto the larger sheet overlapping when wrapped around a pile to position the ends of the smaller sheet in abuting relationship. In this position, the entire surface of the pile will be covered by the fluid-tight chamber. Both ends of the sheet as wrapped around the pile are secured together, and a plurality of bands may be spaced along the wrapped sheets to secure them in position around a pile. A fluid, such as water, may be pumped into the fluid-tight chamber to inflate the chamber, whereby a pressure is exerted against the coating by the inner sheet. The water may be at a suitable temperature so as to maintain the coating material at a proper temperature during the curing process. The inner sheet is formed of sufficient material to enable the sheet to closely conform to various configurations of a pile to which the device is supplied.

Other objects, advantages and features of the present invention will be apparent from the accompanying description and drawings, which are exemplary.

In the drawings:

FIG. 1 is an elevational view of a submerged pile to which a layer of coating material has been applied;

FIG. 2 is a view similar to that of FIG. 1 but showing the inflatable device of the present invention wrapped around the coating material and also showing, schematically, structure for pumping water into the device;

FIG. 3 is a plan view of the device of the present invention in its flattened, unwrapped condition;

FIG. 4 is a sectional view taken along the line 4—4 of FIG. 3;

FIG. 5 is a sectional view taken along the line 5—5 of FIG. 2;

FIG. 6 is a sectional view taken along the line 6—6 of FIG. 2;

FIG. 7 is a vertical sectional view of an H-section pile around which the inflatable device of the present invention has been positioned with the view being taken along the lines 7—7 of FIG. 8;

FIG. 8 is a sectional view taken along the line 8—8 of FIG. 7; and

FIG. 9 is a sectional view taken along the line 9—9 of FIG. 7.

In FIG. 1 there is shown a pile 10, a portion of which is submerged in water 11, with a coating of protective material indicated at 12. The coating extends over that portion of the pile which is at the so-called "splash zone." This portion of the pile is particularly susceptible to the destructive action of waves and debris in the water.

An inflatable device, indicated generally at 13, is positioned around the coating 12. The coating 12 may be of a plastic or resin, and preferably an epoxy resin, which is mixed with a curing agent.

As may be seen in FIG. 3, the inflatable clamping device comprises a first sheet 14 of fluid impervious flexible material to which is attached a second sheet 15 of like material. The sheet 15 is smaller in area than sheet 14 and both sheets are attached along their edges so as to form a fluid-tight chamber 16 between the sheets of material as seen in FIG. 4. A pair of flexible lines or conduits 17 and 18 are attached to the upper and lower portions of sheet 15 so as to communicate with both ends of the chamber 16. These conduits permit the circulation through the chamber of a fluid under pressure.

When the clamping device is wrapped around the pile, the transverse edges 19 and 20 of sheet 14 overlap each other as may be seen in FIGS. 5 and 6 so that the corresponding edges of the fluid-tight chamber are in abutting relationship. In this manner the entire peripheral surface of the pile is enclosed by the chamber as also may be seen in FIG. 6. Clamping bands 21 and 22 are secured to the upper and lower ends of the wrapped clamping device as may be seen in FIGS. 2 and 5. A plurality of bands 23 are secured along the length of the outer surface of the wrapped clamping device to position the clamping device and to restrict expansion of the outer flexible sheet when a fluid under pressure is introduced into the chamber. The bands 23 may comprise lengths of wire with their ends twisted together as at 24 in FIG. 6.

After the inflatable clamping device has been positioned around the coating on a pile as shown in FIG. 2, the device is inflated with a fluid, such as water. The inflated device in effect clamps the inner sheet around the plastic coating and preferably remains in this position until after curing has been completed. As shown in FIG. 2, the water may be recirculated through the device to a heater 25, into a storage tank 26, and then through a pump 27 into conduit 17.

It is pointed out that the water in this flexible clamping device can be controlled both as to pressure and to temperature so as to create and maintain the correct curing atmosphere.

The clamping device is not limited for use with piles or other structures which are cylindrical in shape. The inflatable clamping device may also be used around structures having a wide variety of cross sections including the H-section as illustrated in FIGS. 7-9. The inflatable clamping device employed in FIGS. 7-9 is the same as that described above but with the top and bottom ends of the wrapped clamping device being secured to a circular plate 28 provided with an internal opening which closely conforms to the configuration of the H-section pile 29. The plate 28 may be formed in sections which are bolted together as may be seen in FIG. 9. The clamps 21 secure the upper end of the inflatable clamping device to the outer periphery of the plate 28.

The area of the outer skin or sheet of the clamping device must be sufficient to reach completely around the H-section pile. However, the inner sheet 14 must have ample area so that when inflated, the inner sheet will closely conform to the configuration of the H-section pile and reach into all the inner sections of such a pile so as to create a uniform pressure through out. When the device as shown in FIGS. 7 and 9 is inflated with water under a suitable temperature and pressure, a uniform clamping pressure will be exerted by the inner sheet 14 against the entire coated surface of the section.

Thus, it can be seen that the present invention has disclosed an inflatable clamping device which can be quickly and easily positioned so as to maintain a uniform pressure upon a coating applied to a submerged pile or the like. The device can be applied to piles of a large variety of cross sections. By controlling the temperature of the water used to inflate the clamping device, the coated material may be maintained at a proper temperature throughout the curing process.

It will be understood that various details of construction and arrangement of parts may be made without departing from the spirit of the invention except as defined in the appended claims.

What is claimed is:

1. In combination with a submerged pile structure having a protective coating on the splash zone thereof, of a pressure applying envelope including first and second sheets of fluid impervious flexible material attached together to define a flat fluid-tight chamber therebetween, said envelope being wrappable around said pile structure, means on and for securing said envelope to said pile structure, and conduit means for introducing fluid under pressure to said chamber and inflating said envelope for exerting a clamping pressure on the pile coating during the curing thereof.

2. A device as claimed in claim 1 with said first sheet being larger than said second sheet, the edges of said second sheet being attached to a surface of said first sheet to define a fluid-tight chamber therebetween.

3. A device as claimed in claim 2 with the ends of said first sheet overlapping when said sheets are wrapped around a pile.

4. A device as claimed in claim 1, and comprising means on said sheets for withdrawing fluid from the chamber therebetween so that the fluid may be circulated therethrough.

5. A device as claimed in claim 1 with said fluid being water.

6. A device as claimed in claim 1, with the inner of the two sheets when wrapped around a pile having identations in the surface thereof to provide sufficient material to conform closely to the configuration of the pile.

7. A device as claimed in claim 1 and comprising clamping bands on the upper and lower ends of said sheets when wrapped around a pile to secure tightly the ends of the sheets against the pile.

8. A device as claimed in claim 1 with said securing means comprising a plurality of bands along the length of the wrapped sheets.

References Cited

UNITED STATES PATENTS

| 2,245,909 | 6/1941 | Enfiajian | 5—348 |
| 3,397,260 | 8/1968 | Lamberton | 61—54X |

FOREIGN PATENTS

| 699,152 | 10/1953 | Great Britain | 128—1S.D. |

JACOB SHAPIRO, Primary Examiner

U.S. Cl. X.R.

52—2; 128—402; 264—314